US012559683B2

(12) United States Patent

Del Pia et al.

(10) Patent No.: US 12,559,683 B2
(45) Date of Patent: Feb. 24, 2026

(54) COKE OVEN ROOF REPAIR OR REPLACEMENT

(71) Applicant: PAUL WURTH S.A., Luxembourg (LU)

(72) Inventors: Marco Del Pia, Genoa (IT); Cesare Laviosa, Cogoleto (IT); Ermanno Poggi, Genoa (IT)

(73) Assignee: PAUL WURTH S.A., Luxembourg (LU)

( * ) Notice: Subject to any disclaimer, the term of this patent is extended or adjusted under 35 U.S.C. 154(b) by 0 days.

(21) Appl. No.: 18/860,259

(22) PCT Filed: Jul. 12, 2023

(86) PCT No.: PCT/EP2023/069405
§ 371 (c)(1),
(2) Date: Oct. 25, 2024

(87) PCT Pub. No.: WO2024/013270
PCT Pub. Date: Jan. 18, 2024

(65) Prior Publication Data
US 2025/0313756 A1 Oct. 9, 2025

(30) Foreign Application Priority Data
Jul. 13, 2022 (LU) ....................................... 502 499

(51) Int. Cl.
*C10B 29/06* (2006.01)
*C10B 29/02* (2006.01)
(Continued)

(52) U.S. Cl.
CPC .............. *C10B 29/06* (2013.01); *C10B 29/02* (2013.01); *F27D 1/025* (2013.01); *F27D 1/16* (2013.01);
(Continued)

(58) Field of Classification Search
CPC ......... C10B 29/06; C10B 29/02; F27D 1/025; F27D 1/16; F27D 1/10; F27D 1/02;
(Continued)

(56) References Cited

U.S. PATENT DOCUMENTS 4,564,421 A * 1/1986 Koddenberg ........... C10B 27/06 202/DIG. 1
5,423,152 A * 6/1995 Kolvek ................... C10B 29/02 52/302.4
(Continued)

FOREIGN PATENT DOCUMENTS

JP 2016222758 A * 12/2016
JP 2019038887 A * 3/2019
(Continued)

OTHER PUBLICATIONS

Jan Soonius et al.; "HeatTeQ Fast Wall System Wall repairs in an alternative way", Mar. 1, 2012 (Mar. 1, 2012), XP055078338, Retrieved from the Internet: URL: http:/www.coke-oven-managers.org/PDFs/2012/2012 - Soonius & Apeldoorn A5.pdf [retrieved on Sep. 9, 2013]; pp. 1-11 (Year: 2013).*
(Continued)

*Primary Examiner* — Bayan Salone
(74) *Attorney, Agent, or Firm* — CANTOR COLBURN LLP

(57) ABSTRACT

A method of repairing or replacing a roof of a coke oven battery in operation, said coke oven battery including a number of parallel coking chambers separated by heating walls and delimited on top by a ceiling, itself covered by a roof, the roof having for each coking chamber a number of charging holes or gas transfer holes above the coking chamber, a number of inspection holes above the separating heating walls, one or two base rings connected to one or two gas collecting mains and rail sleepers supporting rails for a coke charging car or charging gas transfer car through an
(Continued)

ascension pipe. A kit of parts with construction modules and the use of such kit of parts in the repairing or replacing of a roof of a coke oven battery in operation and or with at least one oven empty in hot condition is also related.

14 Claims, 2 Drawing Sheets

(51) Int. Cl.
*F27D 1/02* (2006.01)
*F27D 1/16* (2006.01)
*F27D 1/00* (2006.01)

(52) U.S. Cl.
CPC .................. *F27D 2001/005* (2013.01); *F27D 2001/0053* (2013.01); *F27D 2001/161* (2013.01)

(58) Field of Classification Search
CPC ....... F27D 2001/005; F27D 2001/0053; F27D 2001/161
See application file for complete search history.

(56) References Cited

U.S. PATENT DOCUMENTS

| | | | | |
|---|---|---|---|---|
| 7,827,689 | B2 * | 11/2010 | Crane | C10B 29/06<br>29/402.09 |
| 9,505,983 | B2 * | 11/2016 | Friedrichs | C10B 25/24 |
| 2008/0169578 | A1 * | 7/2008 | Crane | C10B 29/06<br>264/30 |
| 2013/0313101 | A1 * | 11/2013 | Friedrichs | C10B 31/02<br>202/251 |

FOREIGN PATENT DOCUMENTS

| | | | | |
|---|---|---|---|---|
| KR | 20140011144 | A * | 1/2014 | C10B 45/00 |
| KR | 20140098356 | A * | 8/2014 | C10B 25/00 |

OTHER PUBLICATIONS

International Preliminary Report on Patentability for Application No. PCT/EP2023/069405, dated Jun. 7, 2024, 19 pages.
International Search Report for Application No. PCT/EP2023/069405, dated Sep. 19, 2023, 4 pages.
Jan Soonius et al, "HeatTeQ FastWall System Wall repairs in an alternative way", retreived on Sep. 9, 2013, www.coke-oven-managers.org, 11 pages.
Written Opinion for Application No. PCT/EP2023/069405, dated Sep. 19, 2023, 10 pages.

* cited by examiner

COKE OVEN ROOF REPAIR OR REPLACEMENT

CROSS-REFERENCE TO RELATED APPLICATIONS

This application is a 35 U.S.C. § 371 National Stage patent application of PCT/EP2023/069405, filed on 12 Jul. 2023, which claims the benefit of Luxembourg patent application 502 499, filed on 13 Jul. 2022, the disclosures of which are incorporated herein by reference in their entirety.

TECHNICAL FIELD

The present disclosure generally relates to the maintenance of existing coke oven batteries, more particularly to an efficient method for replacing or repairing a coke oven battery's roof during continued operation of the coke oven battery.

BACKGROUND

Coke oven batteries are largely used to produce coke by heating coal in an air-free environment at temperatures up to about 1300° C. Such coke oven batteries typically comprise a plurality of side-by-side coking chambers, hereinafter called ovens, which are separated from each other by heating walls and covered by a vault herein after also called ceiling, and a battery roof. The heating walls and the coking chambers extend from one side of the coke oven battery to the other. Typical installations may comprise more than 100 coking chambers, each chamber having a height ranging from 3.5 to about 8 m, a length from about 12 m up to 16 m and a width from about 0.4 m up to 0.5 m. At each end side of the coke chambers are provided coke oven doors allowing airtight closure until, at the end of each coking cycle, the oven doors are removed and the hot coke is discharged from the chamber with the help of a pusher ram mounted on a pusher machine.

While such coke oven batteries may have life times from 30 up to sometimes over 50 years, such extended times of service require appropriate maintenance and repair not only to oppose normal wear and tear, but also in view of growlingly stringent regulations e.g. with regards to gas, dust and generally to visible emissions in connection with raw coke oven gas being originated during coal distillation.

One particularly exposed part of a coke oven battery is their roof, especially for top charging coke oven batteries, wherein the coal is fed through a number of charging holes, usually from 3 to 5, per coking chamber. Indeed, in top charging configurations a heavy charging car is conventionally moved over rails resting on the roof to sequentially feed the coking chambers as required by their coking cycle. While stamp charged ovens are fed through to lateral coke oven doors, they generally comprise a charging gas transfer car moving similarly on rails on the roof of the coke oven battery. Both in top charging batteries and in stamping batteries, roofs are provided with large orifices, in the top of the coking chambers at one side of the roof or on both sides thereof, for collecting and conveying the coke oven gas resulting from the coking operation through a vertical pipe section, so called ascension pipe, to a coke oven gas main collector. The roof also generally comprises inspection holes which are placed over the heating walls directly above and centered with respect to heating flues provided within the heating walls. Finally, the coke oven battery in the upper part also comprises a bracing system including longitudinal and transversal tie rods, which are also generally comprised/embedded within the refractory roof part.

Typical damages to the coke oven battery's roof result in several problems such as:

- raised or uneven charging holes with respect to the battery top floor level and consequential loss of proper sealing between the sleeves of the charging car and the charging holes, which results in difficult coal loading activities thus leading to unwanted coal spreading and dust emissions during the oven loading phase;
- brick fragmentation below the sleepers sustaining the charging car's rails, which results from a pumping effect on the rail caused by the movement of heavy charging car during its constant passages, damages that will dramatically increase over time if left unattended to;
- charging car rails worn and misaligned with consequent problem on the charging car's movements;
- casting parts (e.g. base ring, charging frames and lids, inspection hole frames and their lids) deformations and breakages with high risk of fugitive visible emission;
- general increase of fugitive emissions through cracks that may appear on the refractory top;
- oven roof raised clinker tiles due to thermal expansion and the presence of carbon infiltrated through the expansion joints;
- heating losses/reduced thermal efficiency; and
- abnormal stress of bracing system and possible breakages of tie rods.

In view of their very long expected life times, coke oven batteries may require partial or total coke oven roof repair or replacement more than once depending on operative factors, maintenance procedures and ambient conditions such as presence of heavy rain (tropical conditions). Regularly, even relatively new coke oven batteries, e.g. after a certain period of 5-10 years, need such an intervention.

Most of deep maintenance operation implies that, unless the coke oven is shut down entirely, which is generally not an option, all maintenance works have to be done, to preserve battery productivity, while most of the coke ovens are still in operation and or in hot conditions to preserve refractory integrity that may become damaged below defined temperature thresholds. This so-called "hot repair" does not only mean working in conditions of very high temperatures, but also that the operation of the parts of the coke oven battery not under maintenance cannot be impeded in any significant way. Furthermore, the time any coking chamber is taken out of service, even continuously heated up above a defined temperature threshold, in order to avoid refractory collapse or excessive shrinkage, reduces the output of the coke oven battery and increases its operating costs. Indeed, the oven chambers under roof deep repair or replacement, depending on the level of repair or replacement, must be kept empty with non-negligible loss of coke and gas production.

In view of the above, the timing and number of workers required for the repair or replacement in hot conditions needs to be minimized to reduce costs. The technical solution shall be reliable and long-lasting, its implementation shall improve the safety aspects during demolition and erection, and limit production losses as much possible or to be able to start production earlier.

SUMMARY

The present disclosure provides a method for repairing or replacing the roof of the coke oven battery which can be performed in the "hot condition", namely by only taking out of service a reduced number of coking chambers at one time, while still allowing a quick repair or replacement of substantial parts or generally up to the entire roof of the coke oven battery. The method should also allow for a reduction of the number of workers required at any one time on the coke oven battery roof and for increased safety during the operation.

In order to achieve the above-mentioned advantage, the present disclosure proposes, in a first aspect, a method of repairing or replacing a roof of a coke oven battery in operation. Said coke oven battery comprising a number of parallel coking chambers that are separated from one another by heating walls and that are closed on top by a ceiling, itself covered by a roof. The roof above each coking chamber comprises a first plurality of charging holes or charging gas transfer holes, and one or two ascension pipe holes with a corresponding base ring connected to one or two gas collecting mains. The roof above each heating wall comprises a second plurality of inspection holes and a number of rail sleepers that are configured for supporting rails for a coke charging car or charging gas transfer car. According to the disclosure, the method to be applied for deep reparation or hot repair involving the removal of at least some of the embedded metal parts comprises the following steps:

- I.a) if required (by the extent of the damages), taking out of operation at least one coking chamber by discharging any hot coke contained therein and disconnecting said base ring(s) from the gas collecting main(s), thus not allowing any further raw gas passage in between oven and gas collecting main;
- I.b) removing (at least) any damaged roof parts above said at least one coking chamber and adjacent heating walls, including one or more charging holes or gas transfer holes, inspection holes, base ring(s) and rail sleepers, optionally providing temporary support for the rails above the at least one coking chamber and adjacent heating walls, thereby providing a void space within the roof;
- I.c) providing a set of construction modules, each construction module comprising a set of elements:
  1. a first plurality of charging hole or gas transfer hole modules, each comprising one or more refractory precast support blocks for charging hole or gas transfer hole and a metal charging or gas transfer hole frame with a metal lid;
  2. a second plurality of inspection hole modules, each comprising a refractory precast support block for inspection hole, optionally a refractory precast spacer for inspection hole and a metal inspection hole frame with a metal lid;
  3. one or two base ring modules, each comprising one or more refractory precast support blocks for base ring and a metal base ring;
  4. rail sleeper modules, each comprising one or more refractory precast support blocks for sleeper, optionally a refractory precast spacer for sleeper, and a metal sleeper;
  5. a finishing module comprising a third plurality of liner slabs, mortar and refractory castable filler material;

wherein said refractory precast support blocks are made of low expansion refractory material, such as fused silica;
- I.d) placing the first plurality of charging hole or gas transfer hole modules, and/or the second plurality of inspection hole modules, and/or the base ring module and/or the rail sleeper modules at predetermined respective locations within the space of the roof, according to deepness as required by reparation needs, but not including the ceiling, and if necessary connecting adjacent refractory precast blocks with mortar;
- I.e) partially filling a void space within the roof left after steps I.b) and I.d) with liner slabs (to be chosen in between silica and insulation material depending on the deepness of the area to be filled), said liner slabs being bricks, blocks and/or castable made, and filling the remainder of the void space within the roof by pouring and/or casting a refractory castable material;
- I.f) if previously disconnected, connecting again the base ring(s) with the gas collecting main(s) and taking into operation the at least one coking chamber with the repaired or replaced roof, attaching the rails to the sleepers and, if previously installed, removing the temporary support for the rails provided in step I.b), and
- I.g) repeating steps I.a) to I.f) for a further at least one coking chamber, as necessary or desired.

A second aspect provides a kit of parts comprising a set of construction modules, said set of construction modules comprising a first plurality of charging hole or gas transfer hole modules, each comprising one or more precast charging hole or gas transfer hole support blocks and a hollow metal charging or gas transfer hole with a metal lid, a second plurality of inspection hole modules, each comprising a precast inspection hole support block and a metal inspection hole with a metal lid, one or two base ring modules, each comprising one or more precast base ring support blocks and a metal base ring, rail sleeper modules, each comprising one or more precast sleeper support blocks, a hollow metal sleeper and a filler, and a finishing module comprising a third plurality of liner slabs, mortar and refractory castable filler material, wherein said precast support blocks are made of a low expansion refractory material, such as fused silica.

In a third aspect, the disclosure discloses the use of the kit of parts of the second aspect in the repairing or replacing of a roof of a coke oven battery in operation.

For existing coke oven batteries, due on their long service lives and the maintenance efforts that need to be undertaken to achieve such long operating times, especially at such harsh conditions, each coke oven battery or even sections within a same coke oven battery are different from one another and the actual configuration or the actual damage at any particular location may be different from that found even in close proximity. In particular, the traditional construction of coke oven batteries presents a usually huge number of relatively small bricks with many different shapes. Any maintenance intervention involving the repairing or replacement of parts of the coke oven battery therefore requires a lot of flexibility regarding the situation faced by the repair crew at any particular location. This is particularly true regarding the actual extent of the damages within each section along the roof structure.

As already mentioned in the introduction, the roof of a coke oven battery is exposed to a number of adversities both from the inside of the coke oven battery and from the outside, especially at the key features such as the charging holes or gas transfer holes, the inspection holes, the base ring and the rail sleepers or the underlying supporting structure.

So, while any repair or replacement obviously would allow overcoming any or all of these issues, it would be counterproductive if the method and materials used would only allow a quick repair or replacement, without providing a durable solution, meaning a quality sufficient to assure an extended use without premature failing of the materials and structure provided.

The inventors found that by using a combination comprising a. refractory precast support blocks made of low expansion refractory material. One of the materials that is particularly compatible with the requirements is fused silica precast blocks (hydraulically bonded) in dried shapes, with a minimum $SiO_2$ content of 95 wt.-% and a maximum linear thermal expansion of ±0.20%; and/or b. mortar to connect adjacent precast blocks, said mortar preferably being fireclay mortar. One material that is particularly compatible with the requirement is the fireclay mortar with a minimum $Al_2O_3$ content of 30 wt.-% and a maximum linear thermal expansion of 3%; and/or c. liner slabs to be chosen in between silica and insulation shaped material depending on the deepness of the space to be filled. Characteristics of the material can be different, considering the different conditions they should withstand;

d. refractory castable material, also called filler, to fill all empty volumes left after placing the materials a, b and/or c. One material that is particularly compatible with the requirement is the alumina-silica Medium cement castable, with a content of $Al_2O_3$ in the range of 50 wt.-% to 60 wt.-% and a content of $SiO_2$ in the range of 30 wt.-% to 40 wt.-% and a maximum linear thermal expansion of 1%. Another compatible material is fused silica castable, with a minimum $SiO_2$ content of 95 wt.-% and a maximum linear thermal expansion of ±0.20%;

it is not only possible to reduce the number of differently shaped bricks or blocks to a strict minimum and thus to significantly reduce the time required for appropriately laying and assembling all these bricks and blocks, but moreover a very robust and durable roof structure can be formed in a significantly shorter period. Additionally, due to the use of low thermal expansion material, the resulting roof structure has high dimensional stability, negligible expansion on heating, excellent refractory properties, good compressive strength and proper thermal shock resistance. In some embodiments, it is particularly preferred that the refractory precast support blocks made of low expansion refractory material are made of (the same material as the) refractory castable material (filler). In further embodiments, it is preferred that the refractory precast support blocks and the liner slabs are made of (the same material as the) refractory castable material (filler). The expression "low expansion refractory material" means a refractory material having a linear thermal expansion of at most 5%, preferably at most 3.5%, most preferably at most 2%.

Moreover, in the present methods, all elements of the construction modules can be firstly easily realized in the refractory workshop without the need to have extremely rigid and strict dimensional tolerances of the same. They can then be easily and exactly positioned in their intended location, without requiring precisely dimensioned, shaped and laid surrounding bricks or blocks, nor any complex and time-consuming preparatory work. In fact, the elements of the construction modules only need to be correctly positioned in their intended location and position relative to each other and relative to the unreplaced portions, such that after the pouring and/or casting of the filler, the roof structure forms one refractory unit with all key features at their correct location especially under elevation point of view that often may be critical to grant a proper charging machine telescope operation. This relative positioning can be forecasted along the design phase and eventually slightly adjusted using liner slabs.

In the context of the present disclosure, the term "ceiling" of a coking chamber generally means the lowermost layer of refractory bricks or the lowermost layer of refractory block above the coking chamber, whose lower side closes the upper side coking chamber, generally rests on the upper part of the adjacent heating walls and is in direct contact with the hot environment of the coking chamber. The term "roof" of the coke oven battery generally relates to the parts immediately located above and resting on the ceiling up to uppermost finishing surface in contact with the atmosphere.

As the ceiling or at least parts of the ceiling of the coking chamber(s) beneath the repairing site may also be damaged or need replacement, the method of repairing or replacing a roof of a coke oven battery in operation preferably provides for such situations. Indeed, as already explained above, the actual condition of ceiling and roof at any particular location is generally not known and may only become apparent when the overlying structures are removed. It is therefore advantageous for a coke oven battery roof repairing or replacing method carried out during operation to further comprise the steps of:

I.b1) removing at least any damaged ceiling parts above said at least one coking chamber and adjacent heating walls, wherein said step is carried out during or after step I.b) and before step I.c), and I.c1) providing precast replacement parts made of the low expansion refractory material, such as fused silica, and placing said precast replacement parts at the location of the removed ceiling parts, wherein said step is carried out after step I.b1) or I.c) and before step I.d).

If, after removing the roof parts above a certain coking chamber, damages to parts of the ceiling are determined it is necessary to assess the extent of the damages. It generally is not possible to remove the entire ceiling of that coking chamber. Hence, in practice, should it be apparent that the ceiling is damaged at one location, it might be advantageous to combine steps I.b) and I.b1), i.e. to perform step I.b1) during step I.b). Of course, this decision of performing this additional steps I.b1) and I.c1) may be different from one coking chamber to the next or it may be decided, when inspecting the ceiling of the first coking chamber after (partial) removal of the roof, that independently of the actual condition of the ceilings of the other coking chambers it is recommended to also perform steps I.b1) and I.c1) for all (further) coking chambers.

In the methods according to the first aspect of the disclosure, the void volume of roof remaining after the placement of the construction modules, i.e. before step I.e), may be relatively important and would thus require an important volume of filler and subsequently let set. It might therefore be advantageous, before pouring and casting the filler to at least partially fill up the volume of roof left after the placing of the construction modules, as per the provision described in previous point I.e).

During operation of a coke oven battery, some of the key features included in the roof are submitted to particularly heavy and recurrent strain and wear: especially the frame of charging holes and or the gas transfer holes and the rail sleepers, as well as the structures on which they rest. It has been found that by providing at least these elements made of metal with open hollow structures, the poured filler is able to penetrate and set in these structures, thereby providing a better contact and a much sturdier anchoring of the respective key feature in the roof structure, and thus an increased durability. A hollow structure in this context is a hollow shape allowing the injection/pouring of the fluid filler, the escape of the air during injection/pouring and preferably provide undercut retaining structures and/or injection ports for the fluid filler. In particular, the metal charging or gas transfer holes preferably comprise a ring-shaped hollow volume open at the bottom comprising at least one lower edge forming a casting undercut. The rail sleepers may be made of steel in the shape of a hollow cross-beam or a cross-beam with hollow sections, the hollow being open at their respective ends and/or sides. As rail sleepers are generally placed over a heating wall, they may also comprise one or more integrated inspection holes with a metal lid. Other retaining features can be alternatively or additionally provided if deemed necessary or useful, such as laterally extending metal fins or laterally and/or downwardly extending metal brackets.

Advantageously, each rail sleeper module further comprises an adjustable rail spacer configured for adjusting the position of the rail during the mounting of the rails. Such an adjustable rail spacer is configured to be mounted on top of the rail sleeper such that its horizontal position can be adapted to allow for an easy alignment of the rails. The adjustable rail spacers generally comprise slotted holes allowing the adjusting in longitudinal and transversal directions of the rail spacer itself and, once correctly in place, they are fixed to the rail sleeper e.g. with nuts and bolts. This is of particular interest when the rail sleepers include inspection holes, i.e. when the sleepers must be placed such that the inspection holes are correctly located.

In the present disclosure, the support blocks also often serve as a kind of shuttering formwork to prevent the poured fluid filler to escape from the roof volume and thereby potentially clog the flues within the heating walls or generally flow to unintended places. In some cases, it may also be necessary or advantageous to provide one or more dedicated casting aids to be placed at appropriate locations. Such casting aids generally have simple shapes, such as a tube shape to be placed inside charging or charging gas transfer holes or the base ring. These further casting aids are only temporarily installed and may be re-usable or left in place after setting of the filler. In the latter case, the casting aids are preferably made of materials which will disintegrate at the operation temperatures of the coking chamber once taken into service.

It is noted that processes for repairing or replacing parts of a coke oven battery during operation drastically differ from processes for erecting a new coke oven battery. Indeed, during those so called "hot repair" (i.e. repairing during operation of the coke oven battery), the coking chambers may be exposed to temperatures of up to 950° C. during repair, with their roof being generally exposed to temperatures of at least 200° C. The walls, ceiling and roof of the coking chambers are thus under significant thermal expansion, and newly added replacement parts (such as bricks, support blocks, metal frames, etc.) start increasing in temperature and expanding shorty after being placed at their corresponding location. Thermal expansion of those parts hence occurs during the hot repair and must be taken into consideration throughout the procedure. By contrast, the erection of new coke oven battery is typically performed at ambient temperature and only need to anticipate future thermal expansion, i.e. by leaving gaps between different structural elements. Neglecting the effect of thermal expansion can lead to the formation and subsequent propagation of cracks within the roof of the coking chamber, eventually leading to leaks. While a sufficient heating and expansion of the newly added material generally takes place during the time needed for their installation, it might be advantageous to provide for a step of waiting for the modules placed in step I.d) and/or the liner slabs placed in step I.e) to exceed a predetermined temperature threshold, thereby enabling said modules and/or liner slabs to undergo thermal expansion, before pouring the refractory castable material. Said temperature threshold can be predetermined based on the thermal expansion coefficients of each module, or can be set to a specific value, such as 200° C. or 250° C.

By pouring the refractory castable material after the modules placed in step I.d) and/or the liner slabs placed in step I.e) underwent thermal expansion, it is possible to mold the refractory castable material to the exact geometry of the void/hollow volumes that each module would define in their expanded state, i.e. during operation of the coke oven battery. In other words, the proposed method significantly reduces the formation of cracks within replaced portions of the coking chamber whilst the coke oven battery is in operation, despite differences in thermal coefficients between different module components (e.g. between metal frame, refractory precast support block, and castable material).

BRIEF DESCRIPTION OF THE DRAWINGS

Preferred embodiments of the disclosure will now be described, by way of example, with reference to the accompanying drawings in which.

Further details and advantages of the present disclosure will be apparent from the following detailed description of several not limiting embodiments with reference to the attached drawings.

DETAILED DESCRIPTION OF THE DRAWINGS

FIGS. 1 to 4 show transversal and longitudinal sectional view of advantageous embodiments of four key features integrated within a repaired or replaced coke oven battery roof according to the present disclosure.

Figure 1:
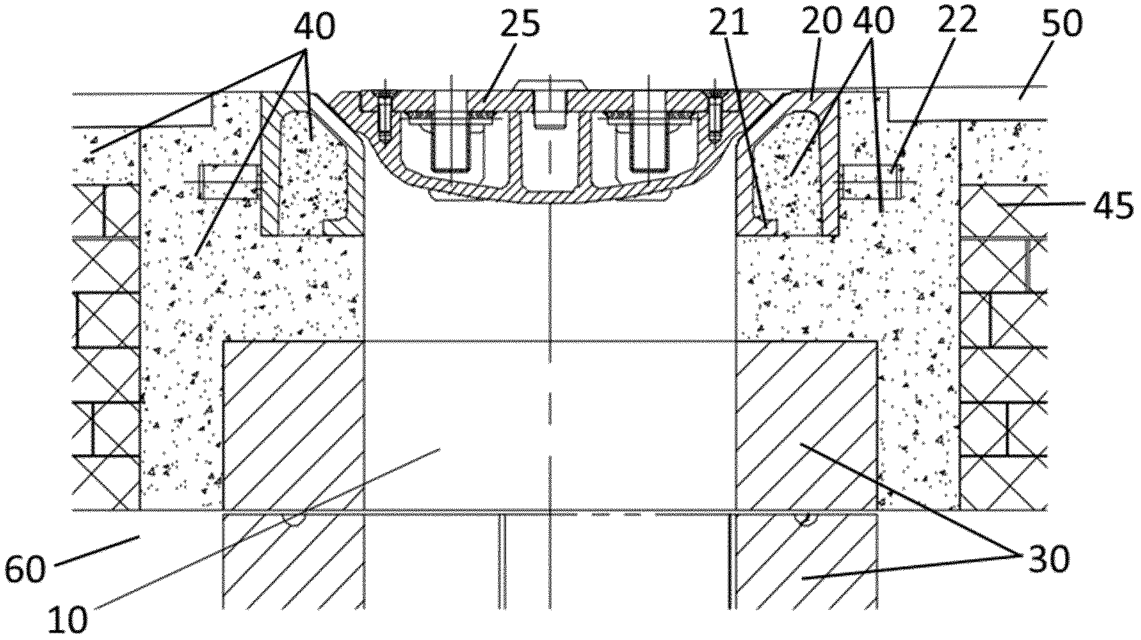
FIG. 1 is a transversal sectional view of an embodiment of a charging hole (a charging gas transfer hole can be similarly made) after repair or replacement of the roof of a coke oven battery.

FIG. 1 is a transversal sectional view of a preferred construction module of a charging hole 10 (or similar design for charging gas transfer hole) above a coking chamber after repair or replacement of the roof of a coke oven battery. In particular, precast charging hole or charging gas transfer hole support blocks 30 are resting on ceiling 60 and a hollow metal charging or gas transfer hole frame 20 (with one or more undercuts 21 and/or one or more anchors for casting 22) with its metal lid 25 is arranged at the top of the roof, preferably such that its upper surface is essentially flush with the top of the floor surface, which in the illustrated case corresponds to the upper (finishing) surface of the clinker tiles or bricks 50. The hollow metal charging or gas transfer hole 20 had been positioned at the correct height and location e.g. with brackets (not shown) before injecting the filler 40 in the hollow structures of the frame 20 and the void volume of the roof. Alternatively, the hollow structures, such as that of the frame 20, can be pre-filled with refractory castable material and subsequently placed in the roof before the refractory castable material sets. This void volume had been reduced according to provision mentioned in point I.e) with precast filler slabs 45.

Figure 2:
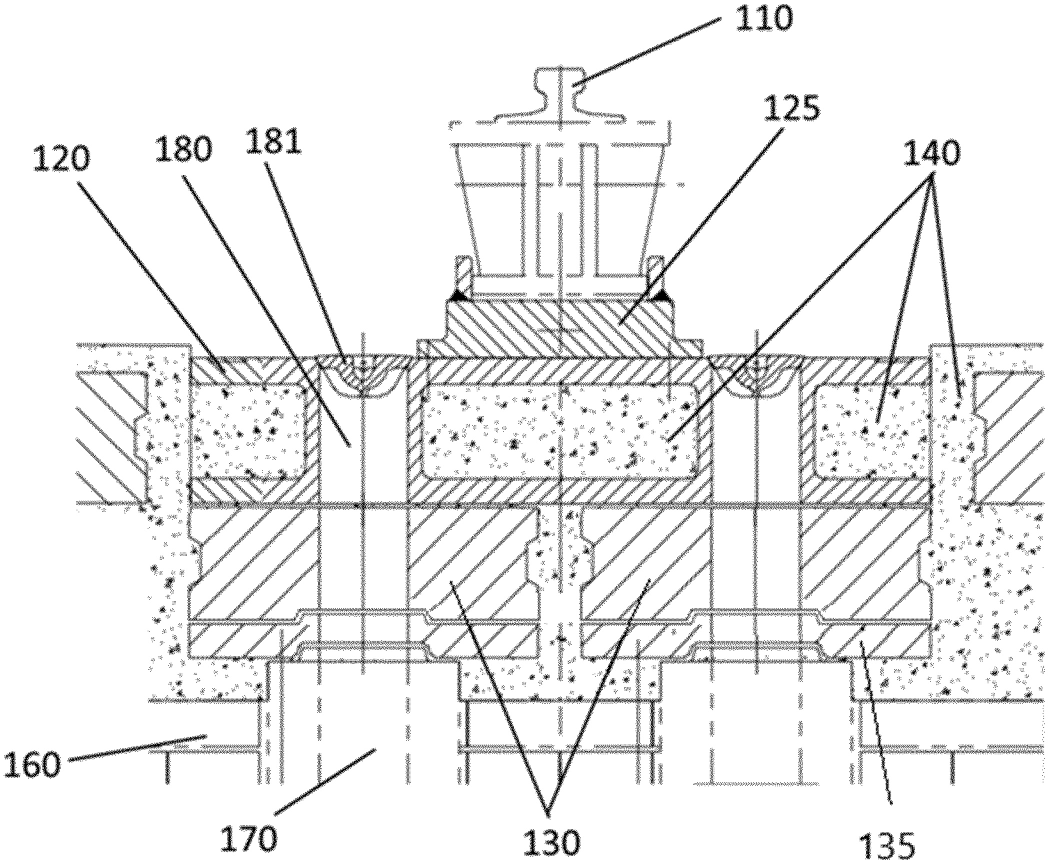
FIG. 2 is a transversal sectional view of an embodiment of a rail sleeper with (optional) mounted rail spacer and rail assembly after repair or replacement of the roof of a coke oven battery. Although illustrated, the rail sleeper does not necessarily integrate inspection holes, in which case of the adjacent inspection holes are similar to the other inspection holes.

FIG. 2 is a transversal sectional view of an embodiment of a construction module of a metal hollow rail sleeper 120 with mounted adjustable rail spacer 125 and rail assembly 110 after repair or replacement of the roof of a coke oven battery. During repair or replacement, the metal hollow rail sleeper 120 is preferably placed on one or more precast rail sleeper support blocks 130, themselves resting on the ceiling 160 above the heating walls or at least partially directly on the heating walls. After their placement, filler 140 is poured around and into the hollow parts of the metal rail sleeper 120 and let set. As the metal hollow rail sleeper 120 is placed above the heating wall comprising flues 170 for the hot gas needed for the coking operation, both the precast rail sleeper support blocks 130 and the hollow metal rail sleeper may be provided with an integrated inspection hole 210, 180 centered above said flue 170 and each inspection hole in hollow rail sleeper 180 is provided with a lid of inspection hole 181. The rail assembly 110 can be fixed with means of an adjustable rail spacer 125 to the metal rail sleeper. The adjustable rail spacer 125 preferably allows it being adjusted in longitudinal and transversal directions and, once correctly in place, it being fixed to the rail sleeper 120 e.g. with nuts and bolts. This allows to first correctly position the rail sleepers 120 including inspection holes 180 relative to the center of the below flues in the heating walls and then to correctly position the adjustable rail spacer 125 relative to the required position of the rail assembly 110. The shown design in FIG. 2 is for reference only.

Figure 3:
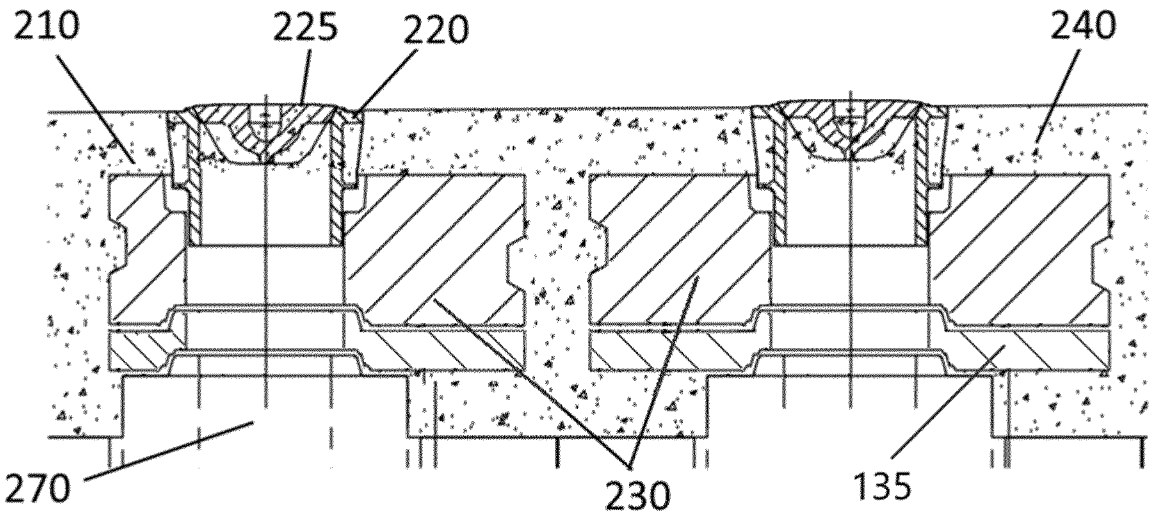
FIG. 3 is a transversal sectional view of an embodiment of an inspection hole after repair or replacement of the roof of a coke oven battery.

FIG. 3 is a longitudinal sectional view of an embodiment of inspection holes 210 using a construction module comprising one or more metal inspection holes 220, precast inspection hole support blocks 230 and metal lids of inspection hole 225 together with a filler 240, after repair or replacement of the roof of a coke oven battery. The metal inspection hole 220 is preferably placed on or into one or more precast inspection hole support blocks 230. The metal inspection hole 220 and the precast inspection hole support block 230 are placed in a centered position above the flue 270 and each inspection hole 210 is provided with a lid of inspection hole 225.

Figure 4:
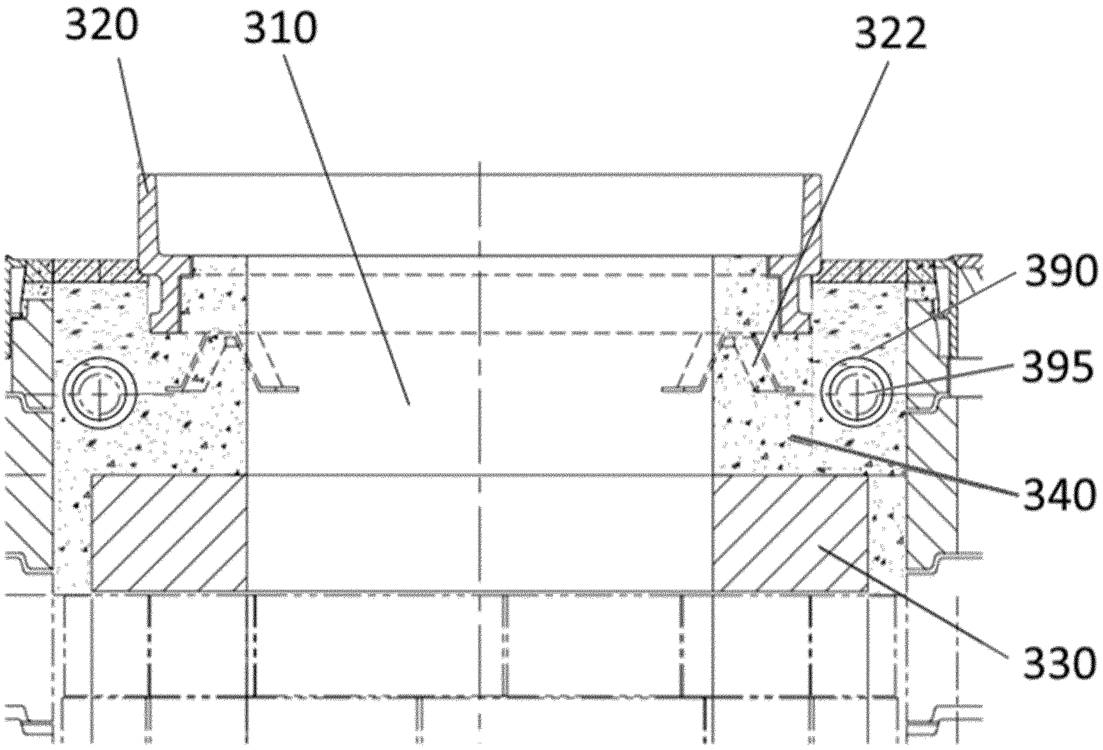
FIG. 4 is a longitudinal sectional view of an embodiment of a base ring with transversal tie rod after repair or replacement of the roof of a coke oven battery.

FIG. 4 is a longitudinal sectional view of an embodiment of ascension pipe hole 310 using an ascension pipe base ring construction module comprising one or more precast base ring support blocks 330 and a metal base ring 320, and poured filler 340. FIG. 4 also shows a transversal tie rod 395 and metal protection shaped enclosure 390 after repair or replacement of the roof of a coke oven battery. One or more precast base ring support blocks 330 are placed covering up to the same level of the ceiling and a metal base ring 320 with anchors for casting 322 (e.g. fins or brackets), which metal base ring 320 may also comprise hollow section similar to the hollow metal charging or gas transfer hole frame 20 in FIG. 1, with or without undercut 21, is positioned relative to the top surface of the roof and centered to the base ring 310. Again, the metal base ring 320 may have been positioned at the correct height and location e.g. with brackets (not shown) before pouring filler 340 in the void volume of the roof. FIG. 4 also shows parts of the bracing system of a coke oven battery, i.e. transversal tie rods 395 in metal protection shaped enclosure 390. Such metal protection shaped enclosures 390 do not only allow the movement/dilatation of the tie rods but protect tie rods from the heat and may also serve to evaluate and monitor the stress and forces exerted on the tie rods 395.

The invention claimed is:

1. A method of repairing or replacing a roof of a coke oven battery in operation, said coke oven battery comprising a number of parallel coking chambers separated by heating walls and delimited on top by a ceiling, itself covered by a roof, the roof comprising for each coking chamber a first plurality of charging holes or gas transfer holes above said coking chamber, a second plurality of inspection holes above said separating heating walls, one or two base rings of an ascension pipe connected to one or two gas collecting mains and rail sleepers configured for supporting rails for a coke charging car or charging gas transfer car, the method including the following steps of:

I.a) if required, taking out of operation at least one coking chamber by discharging any hot coke contained therein and disconnecting said base ring(s) from the gas collecting main(s), I.b) removing any damage roof parts above said at least one coking chamber and adjacent heating walls, including one or more charging holes or gas transfer holes, inspection holes, base ring and rail sleepers, optionally providing temporary support for the rails above the at least one coking chamber and adjacent heating walls, I.c) providing a set of construction modules, each construction module comprising a set of elements: a first plurality of charging hole or gas transfer hole modules, each comprising one or more refractory precast support blocks for charging hole or gas transfer hole and a metal charging or gas transfer hole frame with a metal lid, a second plurality of inspection hole modules, each comprising a refractory precast support block for inspection hole and a metal inspection hole frame with a metal lid, one or two base ring modules, each comprising one or more refractory precast support blocks for base ring and a metal base ring, rail sleeper modules, each comprising one or more refractory precast support blocks for sleeper and a metal sleeper, and a finishing module comprising a third plurality of liner slabs, mortar and refractory castable filler material, wherein said refractory precast support blocks are made of low expansion refractory material, I.d) placing the first plurality of charging hole or gas transfer hole modules, and/or the second plurality of inspection hole modules, and/or the base ring module (s) and/or the rail sleeper modules at predetermined respective locations within the space of the roof, and if necessary connecting adjacent refractory precast blocks with the mortar;

I.e) partially filling a void space within the roof left after steps I.b) and I.d) with liner slabs, and filling the remainder of the void space within the roof by pouring and/or casting the refractory castable material;

I.f) if previously disconnected, connecting the base ring(s) with the gas collecting main(s) and taking into operation the at least one coking chamber with the repaired or replaced roof, attaching the rails to the sleepers and, if previously installed, removing the temporary support for the rails provided in step I.b), and I.g) repeating steps I.a) to I.f) for a further at least one coking chamber, as necessary or desired, wherein the method further includes the following step:

I.d1) waiting for the modules placed in step I.d) and/or the liner slabs placed in step I.e) to exceed a predetermined temperature threshold, thereby enabling said modules and/or liner slabs to undergo thermal expansion, before pouring the refractory castable material;

and wherein the repairing or replacing is performed while the roof of the coking chamber is exposed to a temperature of at least 200° C.

2. The method as claimed in claim 1, wherein the method further comprises the steps of:

I.b1) removing at least any damaged ceiling parts above said at least one coking chamber and adjacent heating walls, wherein said step is carried out during or after step I.b) and before step I.c), and I.c1) providing precast ceiling parts made of the low expansion refractory material and placing said precast ceiling parts at the location of the removed ceiling parts, wherein said step is carried out after step I.b1) or I.c) and before step I.d).

3. The method as claimed in claim 1, wherein a. said refractory precast support blocks made of low expansion refractory material are fused silica precast support blocks, with a minimum $SiO_2$ content of 95 wt.-% and/or a maximum linear thermal expansion of ±0.20%; and/or b. said mortar is fireclay mortar, with a minimum $Al_2O_3$ content of 30 wt.-% and/or a maximum linear thermal expansion of 3%; and/or c. said liner slabs are made of a material chosen between silica and insulation shaped material depending on the deepness of the space to be filled;

d. said refractory castable material use to fill any void left after placing the materials a, b and c is either alumina-silica medium cement castable, with a content of $Al_2O_3$ in the range of 50 wt.-% to 60 wt.-% and/or a content of $SiO_2$ in the range of 30 wt.-% to 40 wt.-% and/or a maximum linear thermal expansion of 1%, or fused silica castable.

4. The method as claimed in claim 1, wherein the refractory precast support blocks made of low expansion refractory material are made of the same material as the refractory castable material; or the refractory precast support blocks and the liner slabs are made of the same material as the refractory castable material.

5. The method as claimed in claim 1, wherein each rail sleeper module further comprises an adjustable rail spacer configured for adjusting the position of the rail during the mounting of the rails.

6. The method as claimed in claim 1, wherein each rail sleeper comprises one or more inspection holes with a metal lid.

7. The method as claimed in claim 1, wherein said temperature threshold is 200° C.

8. The method as claimed in claim 1, wherein said metal charging or gas transfer hole frame(s) and/or said metal sleeper(s) are provided with open hollow structures configured for letting the poured and/or casted refractory castable filler material penetrate and set in these structures.

9. The method as claimed in claim 8, wherein the hollow structures of said metal charging or gas transfer hole frame (s) and/or of said metal sleeper(s) are provided with escapes for air during pouring/casting and/or undercut retaining structures and/or injection ports for the castable refractory filler material, wherein said metal charging or gas transfer hole frame(s) and/or of said metal sleeper(s) are preferably-further provided with laterally extending metal fins and/or laterally or downwardly extending metal brackets.

10. A kit of parts comprising a set of construction modules, for use in a method as claimed in claim 1, said set of construction modules comprising a first plurality of charging hole or gas transfer hole modules, each comprising one or more refractory precast support blocks for charging hole or gas transfer hole and a metal charging or gas transfer hole frame with a metal lid, a second plurality of inspection hole modules, each comprising a refractory precast support block for inspection hole and a metal inspection hole frame with a metal lid, one or two base ring modules, each comprising one or more refractory precast support blocks for base ring and a metal base ring, rail sleeper modules, each comprising one or more refractory precast support blocks for sleeper and a metal sleeper, and a finishing module comprising a third plurality of liner slabs, mortar and refractory castable filler material; wherein said refractory precast support blocks are made of a low expansion refractory material, wherein metal charging or gas transfer hole frame(s) and/or metal sleeper (s) are provided with open hollow structures configured for letting poured and/or casted refractory castable filler material penetrate and set in these structures.

11. The kit of parts as claimed in claim 10, wherein a said refractory precast support blocks made of low expansion refractory material are fused silica precast support blocks, with a minimum SiO.sub.2 content of 95 wt.-% and/or a maximum linear thermal expansion of ±0.20%; and/or b said mortar is fireclay mortar, with a minimum Alsub.20sub3 content of 30 wt.-% and/or a maximum linear thermal expansion of 3%; and/or c said liner slabs are made of a material chosen between silica and insulation shaped material depending on the deepness of the space to be filled; d said refractory castable material use to fill any void left after placing the materials a, b and c is either alumina-silica medium cement castable, with a content of Alsub20sub3 in the range of 50 wt.-% to 60 wt.-% and/or a content of SiOsub2 in the range of 30 wt.-% to 40 wt.-% and/or a maximum linear thermal expansion of 1%, or fused silica castable.

12. The kit of parts as claimed in claim 10, wherein each rail sleeper module further comprises an adjustable rail spacer configured for adjusting the position of a rail to be fixed thereto.

13. The kit of parts as claimed in claim 10, wherein each rail sleeper comprises one or more inspection holes with a metal lid.

14. Use of the kit of parts of claim 10 in the repairing or replacing of a roof of a coke oven battery in operation.

* * * * *